Dec. 1, 1970  O. A. BUDLONG  3,543,457

KNOCKOUT LINER FOR CONCRETE UTILITY VAULTS

Filed Jan. 28, 1969

INVENTOR.
OSCAR A. BUDLONG
BY
Lyon & Lyon
ATTORNEYS

United States Patent Office 3,543,457
Patented Dec. 1, 1970

3,543,457
KNOCKOUT LINER FOR CONCRETE UTILITY VAULTS
Oscar A. Budlong, Santa Ana, Calif., assignor to Brooks Products, Inc., El Monte, Calif., a corporation of California
Filed Jan. 28, 1969, Ser. No. 794,544
Int. Cl. E02d 29/12; E06b 1/56
U.S. Cl. 52—100                        5 Claims

ABSTRACT OF THE DISCLOSURE

A liner intended to fit within a knockout formed in a wall of an underground concrete vault; the liner comprising flanged telescoping sleeves, the flanges of which bear against the walls bordering the knockout, and the outer-sleeve extending outwardly to receive a conduit, whereby the conduit and the linear form a duct to receive utility cables.

BACKGROUND AND SUMMARY OF THE INVENTION

Underground concrete utility vaults are provided with sets of circular weakened areas, commonly called "knockouts" which are intended to be broken or "knocked out" in order to form openings for utility conduits. As presently practiced, such conduits are usually tubular enclosures including plastic sleeves which run between successive utility vaults and through which utility cables are later pulled. Usually it is not known in advance which knockouts will be used; hence, it is customary to place the utility vault in place, then string the conduits between successive vaults with their ends placed in selected knockouts.

It is essential that the conduit ends be sealed in place. This has been done by pouring concrete around the outer wall of the utility vault in the area of the conduit entry; first, however, providing a suitable form and temporarily sealing the space between the conduits and the vault as well as the form. This is a time consuming procedure and further, it cannot ensure a water tight seal in all cases.

The present invention provides a knockout liner which materially simplifies the problems of joining the conduits to the vault without requiring the use of concrete. Accordingly, the present invention is summarized in the following objects:

First, to provide a knockout liner for concrete utility vaults which is secured in each knockout opening and is joined to the conduit so as to provide flared finished ends therefore to facilitate later installation of a utility cable therein.

Second, to provide a guard for this purpose which is particularly simple in construction in that it comprises two telescoping flanged plastic sleeves, the flanges of which bear against the inside and outside margins of the knockout opening clear of the irregular or broken area; the sleeves projecting outwardly from the outside of the opening a substantial distance to provide adequate overlap so that the sleeves may be securely bonded together and which also forms a counterbore to receive and secure an end of a tubular conduit.

SPECIFICATION

Figure 3:
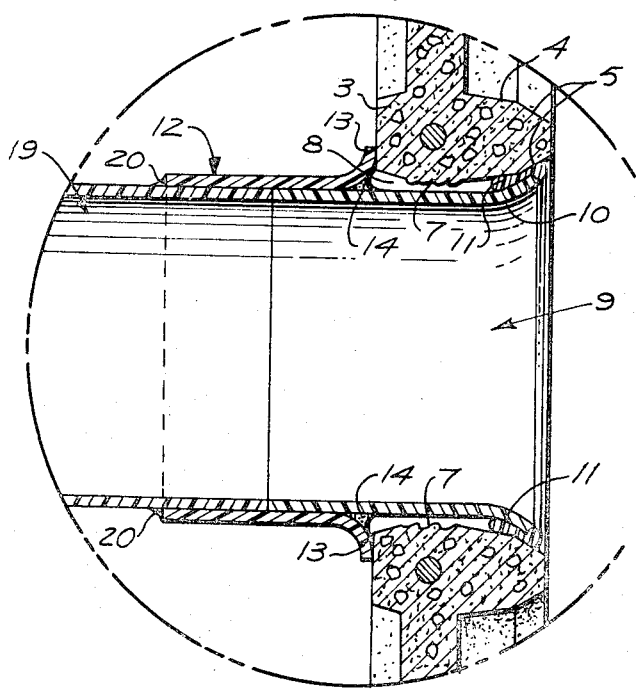
FIG. 3 is an enlarged fragmentary sectional view, taken within circle 3 of FIG. 2.

The knockout liner is adapted to be fitted in the openings provided in utility vaults which receive utility ducts or conduits. Conventionally, utility vaults, indicated by 1, are provided with outwardly projecting bays 2. The extended wall of each bay forms a knockout panel 3, in which are formed recesses 4, facing into the vault and having beveled margins 5. Each recess, which is circular in form, terminates in a knockout disk 6, the outer surface of which is usually recessed in the outer surface of the knockout panel. The thickness of the panel surrounding each knockout disk is sufficiently greater than the thickness of the disk, and is provided with reinforcing so that the disk may be knocked out without damaging the recess 4. However, the walls surrounding the opening formed by removal of the disk 6 are irregular, as indicated by 7 in FIG. 3. The openings 8, formed by removal of selected disks 6, receive the ends of conventional utility conduits which are sealed and secured in place by concrete poured externally of the concrete vault.

In the exercise of the present invention, each opening 8 receives an inner sleeve 9, formed of high-strength plastic material. One end of the inner sleeve is provided with a radially outwardly curving flange 10, which fits over the beveled margin 5 of the corresponding recess 4. Interposed between the flange 10 and the walls of the recess is a yieldable sealing ring 11.

The inner sleeve 9 projects outwardly from the knockout panel 3 and receives an outer sleeve 12, which is also provided with an integral outwardly flared flange 13. The flange 13 bears against the outer surface of the panel 3 surrounding the opening 8.

The two sleeves, 9 and 12, are joined or bonded together by suitable cement or adhesive 14, which is compatible to the selected plastic material forming the sleeves.

Figure 1:
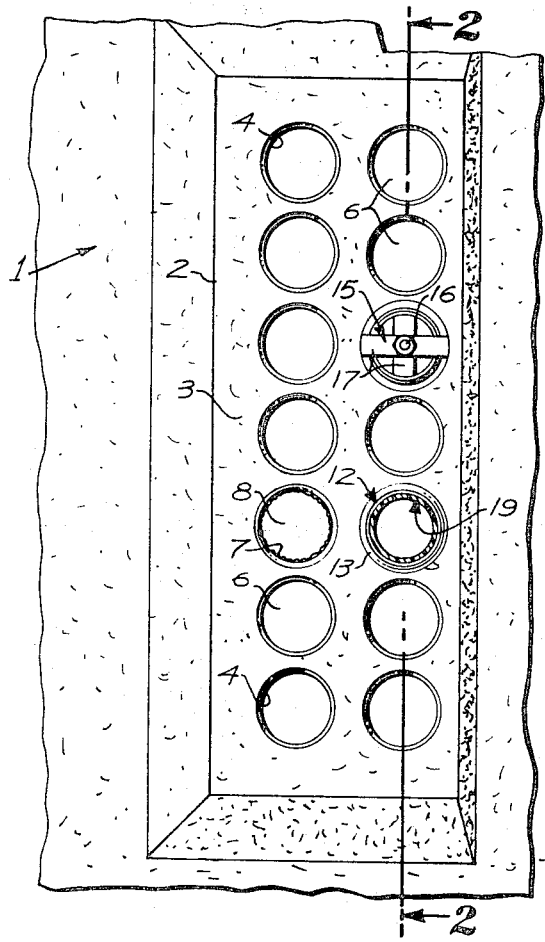
FIG. 1 is a fragmentary end view of a utility vault, showing one of the knockout panels and a pair of knockout liners installed therein.
Figure 2:
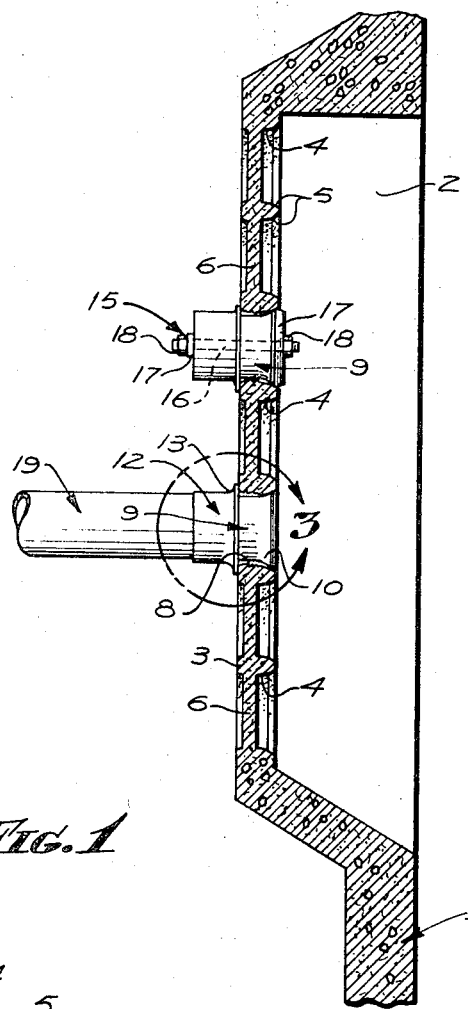
FIG. 2 is a fragmentary sectional view, taken through 2—2 of FIG. 1.

In the course of installing the liner, a clamp 15 is used, which includes a screw shaft 16 and cross bars or disks 17, dimensioned to overlie the remote ends of the two sleeves 9 and 12, as indicated in FIG. 2. Nuts 18 force the cross bars against the ends of the sleeves so that the flange 10 compresses the sealing ring 11 and the flange 13 bears forcibly against the outer wall of the knockout panel, thus placing the inner sleeve 9 under tension. The clamp remains in place until the cement or adhesive 14 has set and the two sleeves are bonded together.

After the linear has been installed, an end of a plastic conduit 19 is inserted in the outer end of the outer sleeve, the outer end of the inner sleeve forming an abutment for the conduit. Additional adhesive 20 is employed to bond and seal the conduit 19 in the sleeve 12. Once the vaults and the conduits are installed, the utility cables may be pulled through the conduits and the liners in a conventional manner. Usually this is done after the conduits are immobilized by earth or concrete poured into the ditch containing the conduits.

While a particular embodiment of this invention has been shown and described, it is not intended to limit the same to the details of the construction set forth, but instead, the invention embraces such changes, modifications and equivalents of the various parts and their relationships as come within the purview of the appended claims.

I claim:

1. The combination with a concrete utility vault having a plurality of internal recesses, each closed initially by a concrete knockout disk, the recess, on removal of the knockout disk, forming an opening having a rough wall portion and relatively smooth inner and outer portions, and a tubular conduit for a utility cable terminating at said vault, of a liner for said opening, said liner comprising:
- (a) a sleeve lining said opening and spaced radially inward of said rough wall portion;
- (b) means extending from said sleeve to the smooth portions of said opening for securing and sealing said sleeve in said opening in spaced relation to the rough wall portion thereof;
- (c) and means for receiving, securing and sealing a terminal end of said conduit with respect to said seleeve.

2. A liner, as defined in claim 1, wherein:
- (a) said securing means includes an integral flange curving radially outward from one end of said sleeve and confronting the smooth inner portion of said opening;
- (b) and a yieldable sealing gasket is disposed between said flange and said smooth inner portion;
- (c) said sleeve is under tension to cause said flange to compress said gasket.

3. A liner, as defined in claim 1, wherein:
- (a) said sleeve is an inner sleeve initially slidable in said opening and protruding from the outer end thereof;
- (b) and said securing means includes a radially outwardly curved flange at the inner end of said inner sleeve confronting the inner portion of said opening; an initially slidable outer sleeve fitting over for bonding connection to the protruding outer end of said inner sleeve, and a second flange integral with said outer sleeve and bearing against the outer end of said opening.

4. A liner, as defined in claim 3, wherein:
- (a) a yieldable sealing gasket is disposed between the inner sleeve flange and the margins of said recess;
- (b) and said inner sleeve is under tension thereby to compress said gasket.

5. The combination with a concrete utility vault having a plurality of internal recesses, each closed initially by a concrete knockout disk, the recess, on removal of the knockout disk, forming an opening having a rough wall portion and relatively smooth inner and outer portions, and a tubular conduit for a utility cable terminating at said vault, of a liner for said opening, said liner comprising:
- (a) an inner sleeve initially slidable in said opening and protruding from the outer end thereof, said inner sleeve having a flange at its inner end confronting the inner portion of said opening;
- (b) a gasket interposed between the inner portion of said opening and the flange of said inner sleeve;
- (c) and an outer sleeve fitting over and bonded to the protruding portion of the inner sleeve, said outer sleeve having a flange adapted to bear against the outer portion of said opening to place the portion of the inner sleeve within said opening under tension thereby to compress said gasket;
- (d) said outer sleeve protruding beyond the inner sleeve and dimensioned to receive said conduit, the outer end of said inner sleeve forming an abutment for said conduit.

References Cited

UNITED STATES PATENTS

| | | | |
|---|---|---|---|
| 2,028,968 | 1/1936 | Carlstrom | 52—196 X |
| 2,266,611 | 12/1941 | Martin et al. | 285—222 X |
| 2,310,877 | 2/1943 | Sperry | 285—162 X |
| 2,398,788 | 4/1946 | Hedrick. | |
| 3,263,378 | 8/1966 | Dorris | 52—100 X |
| 3,390,225 | 6/1968 | Couch et al. | 52—120 X |

PRICE C. FAW, JR., Primary Examiner

U.S. Cl. X.R.

52—20; 174—37, 65; 285—158